Aug. 6, 1957    W. SINDZINSKI ET AL    2,801,725
CONVEYING DEVICE
Filed Oct. 29, 1953    2 Sheets-Sheet 1
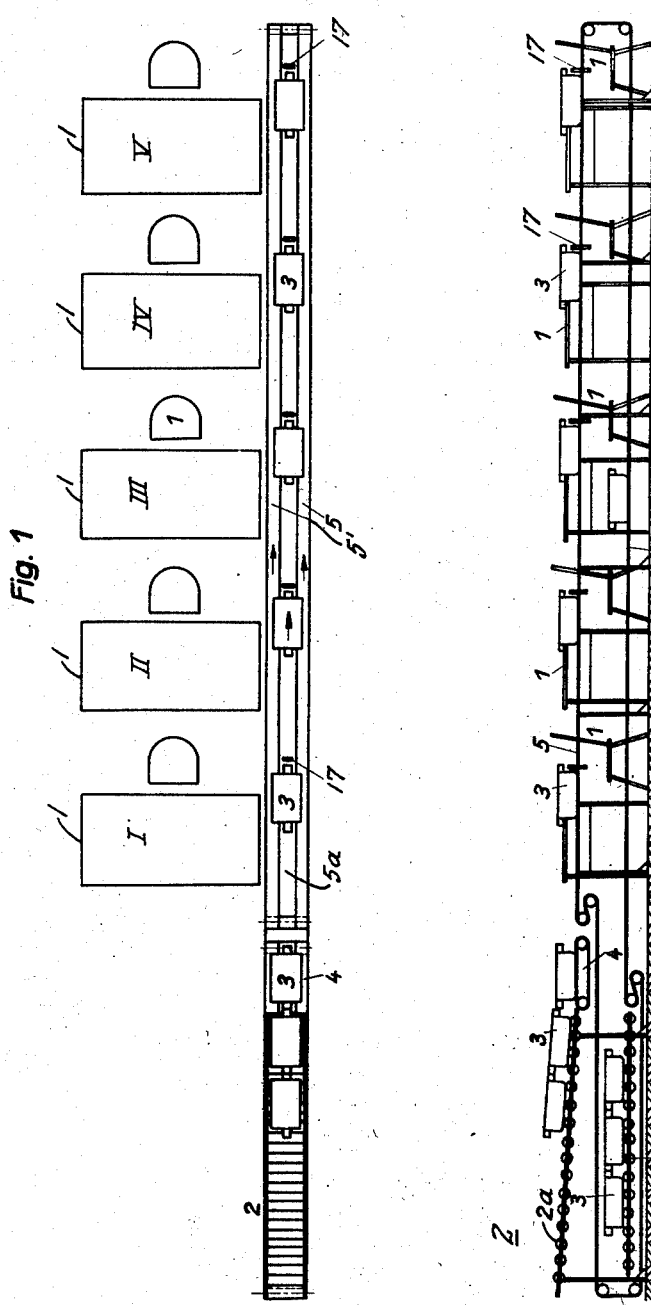
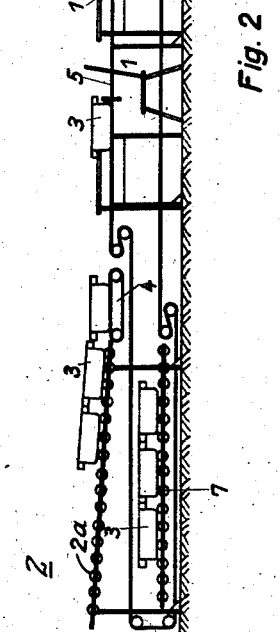
INVENTORS
W. SINDZINSKI-
M. MULLER
BY
ATTORNEY Aug. 6, 1957 W. SINDZINSKI ET AL 2,801,725
CONVEYING DEVICE
Filed Oct. 29, 1953 2 Sheets-Sheet 2

INVENTORS
W. SINDZINSKI
M. MULLER
BY R P Morris
ATTORNEY 2,801,725
CONVEYING DEVICE Willy Sindzinski and Manfred Muller, Berlin, Germany, assignors to Mix & Genest Aktiengesellschaft, Stuttgart, Germany, a corporation of the Federal Republic of Germany Application October 29, 1953, Serial No. 389,108

Claims priority, application Germany October 31, 1952

4 Claims. (Cl. 198—19)

This invention relates to conveyor systems of the kind adapted to supply several individual working positions spaced along the system with the material to be worked upon by them, such as material handled in offices, packing shops, etc.

In prior systems of this type the operator at each working position in want of additional material has to order this of a central feeding station and then is obliged to wait for the arrival thereof. The loss of time thus incurred will be the greater the longer the path of transmission from the distributing station to the waiting working position.

The invention aims to minimize such losses of time. The control means employed by it are independent of the conveyor, such as an endless belt. They are controlled solely by the material being conveyed. To that effect this material is preferably put into containers or other carrying means, hereafter sometimes spoken of in a general way as "dispatch articles," and these are fed to the conveyor at the central feed station thereby to provide a continuous row of spaced articles, on the conveyor. If a dispatch article is removed from an intervening working position, the subsequent dispatched articles will move on in a direction towards the terminal station and fill the gap caused by the removed article and thus recomplete the spaced row of dispatched articles.

A more thorough understanding of the present invention may be had from the following detailed description and the accompanying drawing of one embodiment of the invention in which:

Fig. 1 is a diagrammatic plan view of a conveyor system utilizing the invention;

Fig. 2 is a diagrammatic elevational view of the arrangement shown in Fig. 1;

Figure 3:
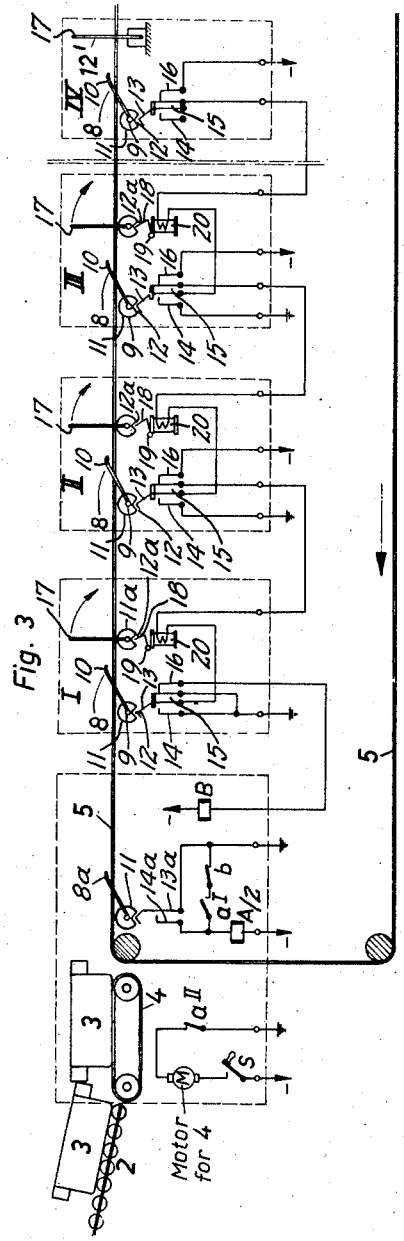
Fig. 3 is a partly diagrammatic and a partly schematic drawing of the arrangement shown in Fig. 1.

Referring now to Figs. 1 and 2, there is shown a group of working positions 1, each spaced from the other and from a central feeding station indicated generally at 2. The function of the central feeding station is to feed materials or articles 3 to the working positions via a selectively operable endless feed belt 4 which, in turn, feeds a main conveyor which is comprised of a pair of parallel endless conveying belts 5, 5' which are spaced apart to define a space 5a therebetween. As will be seen from Fig. 2, feeding station 2 is provided with a first set of conveyor rollers 2a in suitable anti-friction bearings and inclined in a direction toward the feed belt 4 so that gravity will cause articles 3 which may be placed on the rollers to roll down toward belt 4. Belt 4 is in alignment with and adjacent to belts 5 and 5' and is adapted to deliver articles 3 thereto under conditions which will be described below.

As will be seen in Fig. 2, the return or lower run 6 of belts 5, 5' serves to return empty containers or articles 3 from the several working positions in a direction toward station 2, the empty containers eventually being shunted onto a record set of conveyor rollers 7 at station 2.

Each working position 1 is provided with a sensing member 8 having an end pivoting about a pivotal point 9 situated beneath the plane of the surface of belts 5, 5'. The member 8 has a free end 10 extending up above the plane of the surface of belts 5, 5' in the space 5a and normally lying within the path of the articles 3 as they are conveyed on belts 5, 5'. A cam 11 is attached to the pivotal end of member 8 and has a sequentially cut surface 12 into which a complementarily shaped spring 13 is fitted. The spring 13 normally retains the cam and member in the position shown in Fig. 3, but the leading edge of an article 3 is adapted to depress the member 8 as shown in station 1V in Fig. 4, against the tension of spring 13 thereby causing the spring to contact fixed contact 14 and further causing movable contact 15 coupled to, but electrically insulated from spring 13 to break contact with fixed contact 16.

Each working position 1 is provided with a stop arm 17 situated more remote from the feeding station 2 than its sensing member along the belts 5, 5' and pivoted in a manner similar to that of the sensing member 8 and normally maintained in a position substantially perpendicular to the plane of the surface of belts 5, 5' by suitably weighting the lower pivoting end of the stop arm 17 so that it will tend to maintain a vertical position. The stop arm 17 may be normally locked in the vertical position by means of latch 18. Latch 18 is pivoted at point 19 and is adapted to be withdrawn from segment 12a of cam 11a upon energization of electromagnet 20 with which it cooperates. When the latch is released by its electromagnet the leading edge of an article 3 travelling on belts 5, 5' will depress the stop arm associated with said latch and will pass beyond that particular position, as shown, for instance, in Fig. 4, at working position 1VI. This will occur upon condition that the associated electromagnet 20 has been energized, the details of the operation of which will be later explained.

The feed belt 4 is coupled to an electric motor M and is adapted to be driven thereby. An operating circuit for motor M may be traced via ground, back contact aII associated with relay A, windings of motor M, switch S, battery.

Thus, upon closure of switch S, motor M operates and moves belt 4 thereby delivering the article 3, shown on belt 4 in Fig. 3, to the moving main conveyor belts 5, 5'.

At a point near the beginning of the run of main conveyor belts 5, 5', we provide a motor control sensing member 8a which, like the members 8, cooperates with a spring 13a. Spring 13a, in turn is adapted to cooperate with fixed contact 14a and which is adapted to complete an operating circuit for relay A over an obvious circuit. The operation of the device is such that when an article 3 is passed onto the belts 5, 5' from the feeder belt 4, the leading edge of the article 3 depresses the sensing member 8a and causes contact 14a to complete the operating circuit for relay A which thereupon opens its contact aII thereby halting motor M and the belt 4. The cessation of belt 4 will prevent a further article 3 from being delivered to the belts 5, 5'. Relay A maintains a holding circuit for itself via ground, front contact b of normally operated relay B, closed contact aI, winding of relay to battery. Thus even though the first article 3 shall have passed beyond sensing member 8a, and its trailing edge shall have permitted the member to resume its upright position thereby breaking the contact between contact 14a and spring 13a, relay A remains operated and motor M does not yet reoperate and consequently a subsequent article 3 remains on stalled belt 4. In the meantime, the first article 3 which is now approaching working position 1I depresses the sensing member 8 associated with that position and thereby causes the energizing circuit for normally operated relay B to be broken at opened contacts 15, 16. The release of relay B by means of its contact *b* opens the holding circuit for operated relay A which in turn re-closes its back contact *a*II resulting in the re-start of motor M and belt 4. Thereby a second article is delivered from belt 4 to the belts 5, 5'.

When the sensing member 8 associated with working position 1I operates, the spring 13 makes contact with contact 14 thereby completing an energizing circuit for electromagnet 20 associated with the working position 1I, via the following path: ground, contact 14, spring 13, winding of electromagnet 20, contacts 15, 16, associated with the sensing spring assembly of position 1II, and thence to battery. The stop arm 17 associated with working position 1I is thereby released and depressed by the first article 3 which is now enroute to working position 1II. After the passage of the trailing edge of article 3 past the depressed end of arm 17, the arm is returned to its vertical position by the counter-weight in its lower end as previously stated.

The course of operation is repeated until a spaced series of articles 3 is disposed along the belts 5, 5'.

Figure 4:
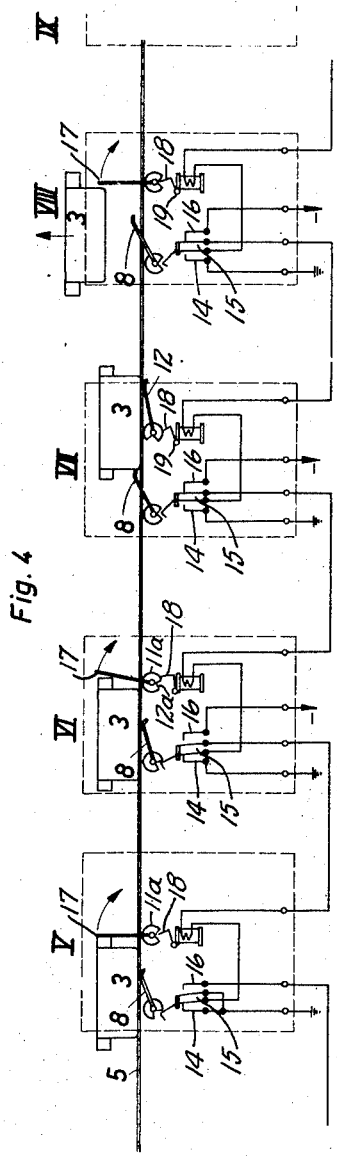
Fig. 4 is a schematic drawing of a portion of the circuit shown in Fig. 3, under a condition of operation.

We will now consider the case where an article is withdrawn at a working position and for the purpose of illustration, it will be assumed that at the position 1VIII an article 3 is lifted from the belts 5, 5' as shown in Fig. 4. Subsequently following articles 3 in the positions 1V, 1VI, and 1VII are in the following stages of transportation:

In station 1V, the article 3 is held immovable against the stop 17 associated with said station because the associated magnet 20 is deenergized, its circuit being open at contacts 15, 16 in position 1VI.

In position 1VI, the article 3 thereat is proceeding toward position 1VII since the electromagnet 20 associated with position 1VI is energized via the closed contacts 15, 16 associated with position 1VII, the sensing member at the last mention position being in its normal position because the trailing edge of the article 3 thereat has cleared same.

In position 1VII, the article 3 thereat is proceeding toward position 1VIII since by the lifting of the article 3 from the belts at position 1VIII, the sensing member 8 at position 1VIII assumes its normal position and the contacts 15, 16 associated therewith complete an energizing circuit for the stop arm 8 at position 1VII thus enabling the arm to be depressed.

It will thus be seen that the release of a stop arm 8 will cause the article at the prior position to advance and the presence of an article at a subsequent position along the belts will cause the halting of all prior articles. It will be apparent that a counter-weight need not necessarily be employed to return the stop arms 17 to their upright position, any suitable resilient element being equally effective to perform such function.

While we have described above the principles of our invention in connection with specific apparatus it is to be clearly understood that this description is made only by way of example and not as a limitation to the scope of our invention as set forth in the objects thereof and in the accompanying claims.

What is claimed is:

1. A conveyor system for selectively advancing conveyed articles from adjacent prior positions as an article is removed from or is advanced to an adjacent subsequent position along the path of said system comprising a main conveyor, a feed device for selectively feeding articles to said conveyor, a plurality of working positions spacedly disposed along the path of said conveyor, each position comprising a sensing element, a stop member, means for selectively unlocking said stop member, switch means under control of said sensing element; said elements and said stop members in proximity to said conveyor and disposed normally in the path of articles transported on said conveyor, said stop members adapted to normally arrest the passage of articles proceeding on said conveyor, electrical circuit means interconnecting the means for selectively unlocking a stop member at a first position along said main conveyor including a series connection between the switch means at said first position and the switch means at a second position, said positions adjacent to each other, the switch means at said first position adapted to complete the electrical circuit for the operation of the unlocking means thereat and the switch means at said second position adapted to open the circuit for the unlocking means at said first station and control means intermediate said first position and said feed device for selectively controlling operation of said feed device, said control means comprising additional sensing means in proximity to said conveyor, whereby the removal of an article from said conveyor at said second position will cause an article at said first position to move to said second position and will cause an article from said feed device to be deposited on said conveyor to fill up the gap of articles on said conveyor caused by said removal.

2. A conveyor system as claimed in claim 1, wherein said main conveyor comprises a pair of endless belts parallel to and spaced from each other, said sensing elements and said stop members positioned within the space between said belts.

3. A conveyor system as claimed in claim 1, wherein said control means for selectively controlling operation of said feed device further comprises a pair of relays, a first of said relays having an operating circuit including the switch means of said first position, the other of said relays having an operating circuit including the switch means associated with said additional sensing member and a contact controlled by said first relay, motor means for driving said feed device, and a contact associated with said second relay for completing the operating circuit of said motor means.

4. A conveyor system as claimed in claim 1, wherein said means for selectively unlocking said stop members further comprises a cam coupled to said sensing means, a latch member and cooperating electromagnets for actuating said latch member, said latch members normally adapted to lock said cams whereby to maintain said stop members in arresting position, said electromagnets adapted to selectively urge said latch members out of locking engagement with said cams.

References Cited in the file of this patent

UNITED STATES PATENTS

| | | |
|---|---|---|
| 1,900,150 | Anderson | Mar. 7, 1933 |
| 2,549,341 | Sperling | Apr. 17, 1951 |
| 2,595,022 | Temple | Apr. 29, 1952 |